Jan. 31, 1950     E. J. VANDER VELDE     2,495,879
UNLOADING VALVE
Filed Aug. 16, 1944
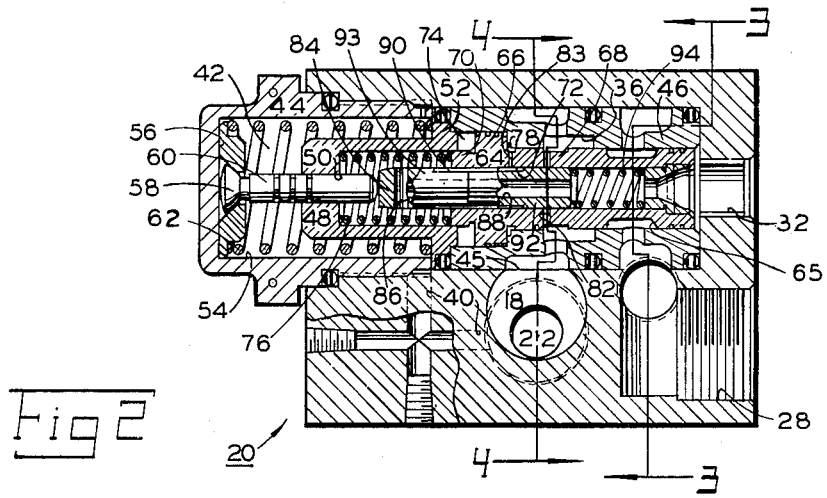
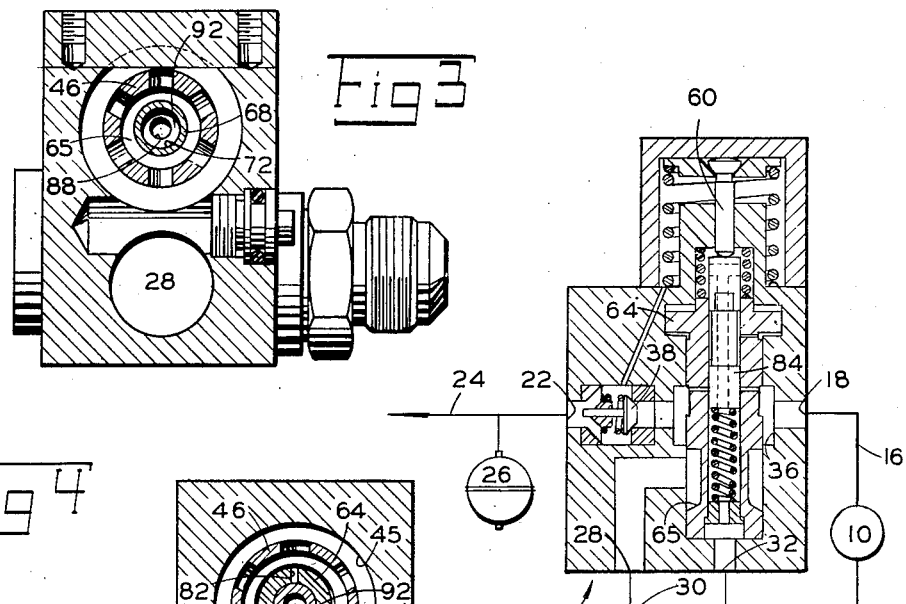
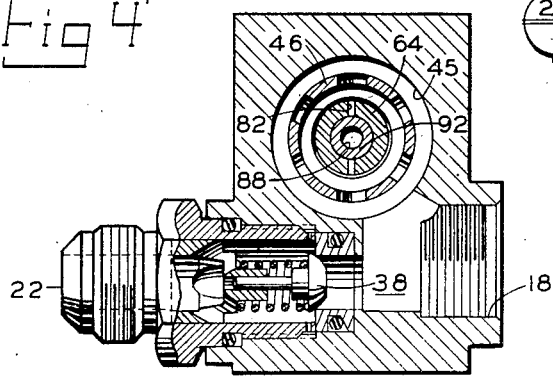
INVENTOR.
EDWARD J. VANDERVELDE
BY
Ralph L. Tweedale
ATTORNEY Patented Jan. 31, 1950

2,495,879

UNITED STATES PATENT OFFICE 2,495,879

UNLOADING VALVE

Edward J. Vander Velde, Huntington Woods, Mich., assignor to Vickers Incorporated, Detroit, Mich., a corporation of Michigan Application August 16, 1944, Serial No. 549,766

18 Claims. (Cl. 137—153)

1

This invention relates to a valve device for use in power transmissions, particularly to those of the type comprising two or more fluid pressure energy translating devices, one of which may function as a pump and another as a fluid motor.

The invention is particularly concerned with unloading valves used in combination with other hydraulic units in hydraulic power transmission systems having a continuously running power pump and especially for aircraft using hydraulic power to operate landing gear, wing flaps, bomb bay doors, and other movable parts, and where the power pump is driven by the engine. In such a hydraulic system the use of an unloading valve is very desirable because from take-off to landing the parts moved by hydraulic power are only in operation a small fraction of the time. Without such unloading valve, the pump being driven by the engine would be constantly developing a working pressure although work was not being performed, thus putting a continual load on the pump, causing not only loss of efficiency but a shorter life for the pump.

It has been a major problem to design an unloading valve suitable and adaptable to various types of aircraft hydraulic systems. One model of an unloading valve appropriate for a hydraulic system having an operating pressure of 1,000 p. s. i. is found to be inappropriate for one having an operating pressure of 1500 p. s. i. One system would be so designed as to have a differential between loading and unloading pressure of 200 p. s. i. and another of 300 p. s. i.

In addition to variances in operating pressure of systems and variances between differential loading and unloading pressures, there are pump volume variances to be taken into consideration. In all of the last-named instances an unloading valve appropriate for one system would operate inefficiently in another system, making it necessary to have a variety of models to fit the needs of a variety of systems.

Another problem encountered is that of a "hanging up" condition; that is, an unloading valve starts to unload but does not do so completely, leaving a partial burden on the pump. In most cases this trouble can be traced to an inappropriate design for a particular system. Trouble is also traceable in some instances to incapability of the unloading valve to operate efficiently when accumulator pressure increases slowly, resulting in a slow cracking process of the unloading valve and stopping at a point short of full unloading position.

2

It is an object of the present invention to provide an unloading valve appropriate for use in a large number of aircraft hydraulic systems in spite of the variances in operating pressures of such systems and whatever the pump volume.

It is also an object of the present invention to provide an unloading valve appropriate for use in aircraft hydraulic systems whatever the narrow or wide differential between loading and unloading values.

It is also an object of the present invention to provide an unloading valve that, no matter how slowly the pressure increases in the accumulator, will insure positive and instantaneous unloading of the pump without any possibility of a "hanging up" condition.

A further object of the invention is to provide an unloading valve light in weight and compact and simple in construction resulting in economy of manufacture, ease in assembly, and long life.

Further objects and advantages of the present invention will be apparent from the following description, reference being had to the accompanying drawing wherein a preferred form of the present invention is clearly shown.

In the drawing:

Figure 1 is a diagrammatic view of a power transmission system incorporating a preferred form of the present invention.

Figure 2 is a diagrammatic cross-sectional view of the unloading mechanism forming a part of the circuit illustrated in Figure 1.

Figure 3 is a cross-sectional view taken on line 1—1 of Figure 2.

Figure 4 is a cross-sectional view taken on line 2—2 of Figure 2.

Referring to Figure 1, there is shown a pump 10 adapted to be driven by any suitable means, such as an aircraft engine, not shown, the pump 10 having a suction conduit 12 for withdrawing fluid from a tank 14 and a pump delivery conduit 16 connected to a pump port 18 of an unloading valve 20. An accumulator port 22 of the valve 20 is connected by a conduit 24 to an air-loaded accumulator 26. The unloading valve 20 also has a tank port 28 connected by a conduit 30 with the tank 14 and also an external drain port 32 connected by a separate conduit 34 with the tank 14.

Referring now to Figures 2, 3 and 4, the accumulator port 22 is provided with a check valve 38 from the outlet side of which a drilled passageway 40 in the valve 20 connects with a main spring chamber 42 in a cap 44 of the valve 20. The body of the valve 20 has a longitudinal bore 45 into which bore is fitted a sleeve 46. A guide 48 having a central stepped bore 50 and a shoulder 52 fits on top of sleeve 46 and extends into a bore 54 of cap 44. When the cap 44 is screwed into the body of valve 20 it holds guide 48 as well as sleeve 46 securely in place.

Guide 48 in conjunction with a main spring restainer 56 forms the main spring chamber 42 within the bore of cap 44 when cap 44 is screwed into the main valve 20. The cup-shaped main spring retainer 56 fits over a head 58 of a cylindrical plunger 60. Plunger 60, which is resiliently loaded by means of a main spring 62, is responsive to accumulator pressure and is shiftable within the bore 50 of guide 48.

A main valve 64, comprising a head 66, a stem 68 and a guide 70, has a central bore 72 and is shiftable within the sleeve 46 of valve 20. The end portion of guide 70 of main valve 64 fits loosely in the large portion of bore 50 of guide 48, which hereinafter will be referred to as chamber 50, and is shiftable therein. When closed, the main valve 64 blocks communication between pump port 18 and tank port 28, and, when open, connects pump port 18 and tank port 28. Main valve 64 fits in sleeve 46 so that there is a small space 74 found in the sleeve 46 between the top of head 66 and the bottom of guide 48. A spring 46, mounted within the chamber 50 and resting on top of guide 70 of the main valve 64, biases main valve 64 to the closed position. The head of main valve 64 fits into the sleeve 46 in valve 20 so that there is a small fluid chamber space 78 formed directly under the head 66 of main valve 64. There is a drilled hole 82 through the stem 68 near the base of head 66 of the main valve 64. There is also a radially drilled hole 83 in stem 68 of main valve 64 aligned with space 78. The hole 83, with main valve 64 in the open position, connects conduit 36 and drilled hole 82 with space 78. The main valve 64 has a recessed portion 65 in the stem 68. When the main valve 64 is closed, connection is blocked between the conduit 36 and the recessed portion 65.

Fitting and shiftable within the central bore 72 of main valve 64 is a three-way pilot valve 84 separate from the plunger 60. The pilot valve 84 has a drilled hole 86 through its left end portion connecting with a centrally drilled passageway 88 connecting to drain port 32. The pilot valve 84 has flats 90 and lands 92 and 93. The land 92 serves to block connection between conduit 36 and hole 82 in the main valve 64 in the position of the pilot valve 84 illustrated in Figure 2. In the other position of pilot valve 84, land 92 connects conduit 36 with hole 82 in main valve 64. Thus, main valve 64 may properly be said to have two sections, one of which serves as a housing portion for the pilot valve 84 and the other of which is the main valving section containing recess 65. The pilot valve housing portion, being a part of and connected to the main valving section, will shift therewith, and thus the movement of the main valve serves to control the opening of the pilot valve ports.

A spring valve 94 fitting in the central bore 72 of main valve 64 tends to maintain contact between plunger 60 and pilot valve 84 and also acts as a return spring to shift pilot valve 84 to its illustrated position. Any seepage past land 92 or main valve 64 will drain by way of flats 90, chamber 50, drilled hole 86 and central passageway 88 to drain 32. This is made possible with valve 20 in the loaded position because flats 90 of pilot valve 84 communicate with chamber 50. However, with valve 20 in the unloaded position, communication between flats 90 and chamber 50 to drain port 32 is blocked by reason of flats 90 being sealed off within bore 72 of main valve 64.

In operation, fluid under pressure from pump 10 enters conduit 16 and pump port 18 of unloading valve 20. When fluid under pressure in accumulator 26 is at a predetermined low value, the full volume of pump 10 enters conduit 36, passes around main valve 64, through check valve 38, out accumulator port 22 to conduit 24 and thence to accumulator 26. In the closed position of the main valve 64, as illustrated, communication between pump port 18 and tank port 28 is blocked.

When pressure in the accumulator rises to a predetermined maximum value, the main valve 64 shifts and opens communication between pump port 18 and tank port 28. The pump is thereby unloaded until such further time as pressure in the accumulator again drops to a predetermined low value, and the process is again repeated.

Referring now to Figure 2, valve 20 is in the loaded position with main valve 64 blocking communication between pump port 18 and tank port 28. Fluid under pressure from pump 10 is going through check valve 38 to the accumulator port 22. When pressure in the accumulator 26 reaches a predetermined maximum value, it reacts upon the resiliently-loaded plunger 60 by way of drilled passageway 40 and main spring chamber 42. As the pressure rises in the accumulator 26, it begins to shift plunger 60 against the resistance offered by main spring 62. Plunger 60, actuated against main spring resistance 62, shifts pilot valve 84.

Up to this time the land 92 on pilot valve 84 has sealed off conduit 36 and drilled hole 82 in the main valve 64 from communication with space 78. As the pressure increases, plunger 60 continues to actuate pilot valve 84 which shifts within the bore 72 of main valve 64. The land 92 on pilot valve 84 finally opens communication to conduit 36 by breaking over the drilled hole 82 in main valve 64. Communication being established between conduit 36, drilled hole 82 and drilled hole 83 in the main valve 64, fluid under pressure from pump 10 is now conducted to the underside of head 66 and space 78.

At this point the main valve 64 shifts in opposition to the movement of pilot valve 84. Similarly, land 92 of pilot valve 84 moves in opposition to movement of the stem 68 containing hole 82 in main valve 64. This movement of pilot valve 84 and main valve 64 in opposition to each other insures a rapid and complete opening of hole 82 which in turn insures a positive and instantaneous shifting of the main valve 64 to unload the pump 10. When main valve 64 shifts completely, the recessed portion 65 of main valve 64 connects with conduit 36 opening pump port 18 to tank port 28 and permitting full flow of the pump 10 to tank 14.

During this process, because of the telescopic arrangement of pilot valve 84 and main valve 64, the flats 90 of pilot valve 84 are sealed off from chamber 50 and consequently drain 32. As main valve 64 shifts in opposition to pilot valve 84, fluid in space 74 escapes slowly around guide 70 to chamber 50 and thence to drain 32 by way of drilled hole 86 and passageway 88. This is made possible because guide 70 of main valve 64 fits freely in chamber 50 of guide 48. Thus, by this slow escape of fluid, amounting to a metering out process, space 74 acts as a dashpot to cushion the shock of unloading.

When the pressure in accumulator 26 begins to decrease, main spring 62 shifts plunger 60, and pilot valve 84 shifts and follows the plunger 60 by reason of spring 94. When pressure in accumulator 26 reaches a predetermined value, land 92 on pilot valve 84 seals off drilled hole 82 in the main valve 64 from conduit 36. Simultaneously, the flats 90 pass over the upper side of head 66 of main valve 64, releasing pressure on the underside of head 66 by way of chamber 56 through drilled hole 86 and drilled passageway 88 in pilot valve 84 to drain 32. Upon release of pressure from the underside of head 66 to drain 32, the spring 76 returns main valve 64 to closed position and blocks communication between conduit 36 and recessed portion 65 of stem 68 of main valve 64. The full volume of pump 10 is again directed to the accumulator 26 because communication between pump port 18 and tank port 28 is blocked.

Although unloading valve 20 has been shown and described in operation in a hydraulic system containing an accumulator, it should be noted that, when the transmission is such that its elements possess inherent characteristics of expansiveness, the unloading valve 20 will perform exactly as well in the same manner without the use of an accumulator.

It should be noted that the invention provides for a pressure responsive, resiliently-loaded plunger separate from the pilot valve and that, by having the plunger in one bore and the pilot valve in another bore, manufacture of the valve is simplified because of not being held too closely to very fine tolerances.

It should also be noted that the telescopic arrangement of the pilot valve and main valve, with the valves moving in opposite directions to operate the main valve and thus unload or load the pump, assures a smooth, instantaneous and positive operation of the main valve through its full stroke.

It should also be noted that the main spring and length of stroke of the pilot valve determines the loading and unloading pressure and that, by changing the spring or the dimensions of the pilot valve or both, the pressure differential ranges thereby established are very wide in scope.

While the form of embodiment of the invention as herein disclosed constitutes a preferred form, it is to be understood that other forms might be adopted, all coming within the scope of the claims which follow.

What is claimed is as follows:

1. An unloading valve constructed for use in a hydraulic power system having a pump, a tank, and an accumulator, comprising a body having a pump port, a tank port and an accumulator port, a main valve shiftable in said body and adapted when open to connect the pump and tank ports and when closed to block communication therebetween, hydraulic operating means for shifting said valve, and a pressure responsive pilot valve hydraulically connected to control the operating means, said pilot valve and main valve being telescopically arranged with pilot valve ports conjointly controlled thereby, said valves moving in opposite directions to operate the main valve whereby positive operation of the main valve through its full stroke is assured.

2. An unloading valve constructed for use in a hydraulic power system having a pump, a tank, and an accumulator, comprising a body having a pump port, a tank port and an accumulator port, a main valve shiftable in said body and adapted when open to connect the pump and tank ports and when closed to block communication therebetween, hydraulic operating means for shifting said valve, and a pressure responsive pilot valve hydraulically connected to the accumulator port and responsive to pressure changes thereat to control the operating means, said pilot valve and main valve being telescopically arranged with pilot valve ports conjointly controlled thereby, said valves moving in opposite directions to operate the main valve whereby positive operation of the main valve through its full stroke is assured.

3. An unloading valve constructed for use in a hydraulic power system having a pump, a tank, and an accumulator, comprising a body having a pump port, a tank port and an accumulator port, a main valve shiftable in said body and adapted when open to connect the pump and tank ports and when closed to block communication therebetween, hydraulic operating means for shifting said valve, a pressure responsive pilot valve hydraulically connected to the accumulator port and responsive to pressure changes at said port to control the operating means, and an integral check valve between the pump port and the accumulator port preventing flow from the accumulator port towards the pump port, said pilot valve and main valve being telescopically arranged with pilot valve ports conjointly controlled thereby, said valves moving in opposite directions to operate the main valve whereby positive and instantaneous operation of the main valve through its full stroke is assured.

4. An unloading valve constructed for use in a hydraulic power system having a pump, a tank, and an accumulator, comprising a body having a pump port, a tank port and an accumulator port, a main valve shiftable in said body and adapted when open to connect the pump and tank ports and when closed to block communication therebetween, hydraulic operating means for shifting said valve, a pressure responsive pilot valve hydraulically connected to the accumulator port and responsive to pressure changes at said port to control the operating means, an integral check valve between the pump port and the accumulator port preventing flow from the accumulator port towards the pump port, and a separate pressure responsive means for actuating said pilot valve, said pilot valve and main valve being telescopically arranged with pilot valves ports conjointly controlled thereby, said valves moving in opposite directions to operate the main valve whereby positive operation of the main valve through its full stroke is assured.

5. An unloading valve constructed for use in a hydraulic power system having a pump, a tank, and an accumulator, comprising a body having a pump port, a tank port and an accumulator port, a main valve shiftable in said body and adapted when open to connect the pump and tank ports and when closed to block communication therebetween, hydraulic operating means for shifting said valve, a pressure responsive pilot valve hydraulically connected to the accumulator port and responsive to pressure changes at said port to control the operating means, an integral check valve between the pump port and the accumulator port preventing flow from the accumulator port towards the pump port, and a separate pressure responsive means for actuating said pilot valve comprising a resiliently loaded plunger, said pilot valve and main valve being telescopically arranged with pilot valve ports conjointly controlled thereby, said valves moving in opposite directions to operate the main valve whereby positive operation of the main valve through its full stroke is assured.

6. An unloading valve constructed for use in a hydraulic power system having a pump, a tank, and an accumulator, comprising a body having a pump port, a tank port and an accumulator port, a main valve shiftable in said body and adapted when open to connect the pump and tank ports and when closed to block communication therebetween, hydraulic operating means for shifting said valve, a pressure responsive pilot valve hydraulically connected to the accumulator port and responsive to pressure changes at said port to control the operating means, an integral check valve between the pump port and the accumulator port preventing flow from the accumulator port towards the pump port, and a separate pressure responsive means for actuating said pilot valve, said separate means being a resiliently loaded plunger responsive to pressure changes at the accumulator port, said pilot valve and main valve being telescopically arranged with pilot valve ports conjointly controlled thereby, said valves moving in opposite directions to operate the main valve whereby positive and instantaneous operation of the main valve through its full stroke is assured.

7. An unloading valve constructed for use in a hydraulic power system having a pump, a tank, and an accumulator, comprising a body having a pump port, a tank port and an accumulator port, a main valve biased to the closed position and shiftable in said body and adapted when open to connect the pump and tank ports and when closed to block communication therebetween, hydraulic operating means for shifting said valve, a pressure responsive, three-way pilot valve hydraulically connected to the accumulator port and responsive to pressure changes thereat to control the operating means, an integral check valve between the pump port and the accumulator port preventing flow from the accumulator port towards the pump port, and a separate pressure responsive means for actuating said pilot valve comprising a resiliently loaded plunger, said pilot valve and main valve being telescopically arranged with pilot valve ports conjointly controlled thereby, said valves moving in opposite directions to operate the main valve whereby positive and instantaneous operation of the main valve through its full stroke is assured.

8. An unloading valve constructed for use in a hydraulic power system having a pump, a tank, and an accumulator, comprising a body having a pump port, a tank port and an accumulator port, a main valve shiftable in said body and adapted when open to connect the pump and tank ports and when closed to block communication therebetween, hydraulic operating means for shifting said valve, and a pressure responsive, three-way pilot valve having lands and flats to control the operating means, whereby in one position it is open to the pump port and in another position it is open to the tank port, said pilot valve and main valve being telescopically arranged with pilot valve ports conjointly controlled thereby, said valves moving in opposite directions to operate the main valve whereby positive operation of the main valve through its full stroke is assured.

9. An unloading valve constructed for use in a hydraulic power system having a pump, a tank, and an accumulator, comprising a body having a pump port, a tank port, an external drain port and an accumulator port, a main valve shiftable in said body and adapted when open to connect the pump and tank ports and when closed to block communication therebetween, hydraulic operating means for shifting said valve, and a pressure responsive, three-way pilot valve hydraulically connected to control the operating means, whereby in one position it is open to the pump port and in another position it is open to the external drain port, said pilot valve and main valve being telescopically arranged with pilot valve ports conjointly controlled thereby, said valves moving in opposite directions to operate the main valve whereby positive operation of the main valve through its full stroke is assured.

10. An unloading valve constructed for use in a hydraulic power system having a pump, a tank, and an accumulator, comprising a body having a pump port, a tank port and an accumulator port, a main valve shiftable in said body and adapted when open to connect the pump and tank ports and when closed to block communication therebetween, hydraulic operating means for shifting said valve, and a pressure responsive, three-way pilot valve having lands and flats to control the operating means, mechanically connected to a separate pressure responsive means for actuating said pilot valve, said pressure responsive means being a resiliently loaded plunger responsive to pressure changes at the accumulator port, said pilot valve and main valve being telescopically arranged with pilot valve ports conjointly controlled thereby, said valves moving in opposite direction to operate the main valve whereby positive and instantaneous operation of the main valve through its full stroke is assured.

11. In a hydraulic transmission having a fluid source and a pressure source, a pressure-responsive, shiftable main valve resiliently biased to one end of its stroke, a shiftable pilot valve, a shiftable housing telescopically arranged with the pilot valve having a first port connected to the pressure source, a second port connected to the main valve and a third port connected to the fluid source, means connecting the main valve to the pilot valve housing for simultaneous shifting thereof, means for shifting the pilot valve, and means formed as an integral part of said pilot valve upon being shifted to one position to open the first port to the second port while blocking the third port, and upon being shifted to another position to open the second port to the third port while blocking the first port, whereby, upon the pilot valve being shifted to one position to initially open the first port to the second port, the main valve is actuated to shift the housing in a directional movement opposite to the pilot valve, and a continued shifting of the pilot valve in opposition to the pilot valve housing opens the first port to the second port more fully to insure positive and complete operation of the main valve to one end of its stroke.

12. In a hydraulic transmission having a fluid source and a pressure source, a pressure-responsive, shiftable main valve resiliently biased to one end of its stroke, a shiftable pilot valve, a shiftable housing telescopically arranged with the pilot valve having a first port connected to the pressure source, a second port connected to the main valve and a third port connected to the fluid source, means connecting the main valve to the pilot valve housing for simultaneous shifting thereof, means for shifting the pilot valve, and means formed as an integral part of said pilot valve upon being shifted to one position to open the first port to the second port while blocking the third port, and upon being shifted to another position to open the second port to the third port while blocking the first port, whereby, upon the pilot valve being shifted to one position to initially open the second port to the third port, the main valve is actuated to shift the housing in a directional movement opposite to the pilot valve, and a continued shifting of the pilot valve in opposition to the pilot valve housing opens the second port to the third port more fully to insure positive and complete operation of the main valve to one end of its stroke.

13. In a hydraulic transmission having a fluid source and a pressure source, a pressure-responsive, shiftable main valve resiliently biased to one end of its stroke, a shiftable pilot valve, a shiftable housing telescopically arranged with the pilot valve having a first port connected to the pressure source, a second port connected to the main valve and a third port connected to the fluid source, means connecting the main valve to the pilot valve housing for simultaneous shifting thereof, means for shifting the pilot valve, and means formed as an integral part of said pilot valve upon being shifted to one position to open the first port to the second port while blocking the third port, and upon being shifted to another position to open the second port to the third port while blocking the first port, whereby, upon the pilot valve being shifted to one position to initially open the first port to the second port or upon the pilot valve being shifted to another position to initially open the second port to the third port, the main valve is actuated to shift the housing of the pilot valve in a directional movement opposite to that of the pilot valve, and a continued shifting of the pilot valve in each position thereof opens the first port to the second port in one case and the second port to the third port in the other case more fully and rapidly to insure positive and complete operation of the main valve in each direction.

14. In a hydraulic power transmission having a fluid source and a pressure source, the combination of a first shiftable valve, pressure-operated means connected to the first valve for shifting the same, a second shiftable valve, a shiftable housing telescopically arranged with the second valve having a first port connected to the pressure source, a second port connected to the first valve-shifting means and a third port connected to the fluid source, means connecting the first valve to the second valve housing for simultaneous shifting in the same direction, means for shifting the second valve, means formed as an integral part of the second valve upon being shifted to one position to open the first port to the second port while blocking the third port, and upon being shifted to another position to open the second port to the third port while blocking the first port, whereby, upon shifting the second valve to one position to open the first port to the second port, the first valve is initially shifted to shift the housing in opposition to the second valve, and a continued shifting of the second valve in opposition to the shifting of the housing thereof opens more fully the first port to the second port to insure positive and complete operation of the first valve.

15. In a hydraulic power transmission having a fluid source and a pressure source, the combination of a first shiftable valve, pressure-operated means connected to the first valve for shifting the same, a second shiftable valve, a shiftable housing telescopically arranged with the second valve having a first port connected to the pressure source, a second port connected to the first valve-shifting means and a third port connected to the fluid source, means connecting the first valve to the second valve housing for simultaneous shifting in the same direction, means for shifting the second valve, means formed as an integral part of the second valve upon being shifted to one position to open the first port to the second port while blocking the third port, and upon being shifted to another position to open the second port to the third port while blocking the first port, whereby, upon shifting the second valve to one position to open the second port to the third port, the first valve is initially shifted to shift the housing in opposition to the second valve, and a continued shifting of the second valve in opposition to the shifting of the housing thereof opens more fully and rapidly the second port to the third port to insure positive and complete operation of the first valve.

16. In a hydraulic power transmission having a fluid source and a pressure source, the combination of a first shiftable valve, pressure-operated means connected to the first valve for shifting the same, a second shiftable valve, a shiftable housing telescopically arranged with the second valve having a first port connected to the pressure source, a second port connected to the first valve-shifting means, and a third port connected to the fluid source, means connecting the first valve to the second valve housing for simultaneous shifting in the same direction, means for shifting the second valve, means formed as an integral part of the second valve upon being shifted to one position to open the first port to the second port while blocking the third port, and upon being shifted to another position to open the second port to the third port while blocking the first port, whereby, upon shifting the second valve to one position to open the first port to the second port, the first valve is initially shifted in one direction to shift the housing in directional opposition to the second valve, and a continued shifting of the second valve in opposition to the shifting of the housing thereof opens more fully and rapidly the first port to the second port to insure positive and complete operation of the first valve in one direction, and, upon the second valve being shifted to another position to open the second port to the third port, the first valve is initially shifted in the opposite direction to shift the housing in directional opposition to the second valve, and a continued shifting of the second valve in opposition to the shifting of the housing thereof opens more fully and rapidly the second port to the third port to insure positive and complete operation of the first valve in the opposite direction.

17. In a hydraulic system containing a tank and a fluid pump, a pressure-responsive, shiftable main valve resiliently biased to one end of its stroke, a shiftable pilot valve, a shiftable housing therefor having a pump port, a tank port and a main valve port telescopically arranged with the pilot valve, means formed as an integral part of the pilot valve to open the pump port to the main valve port and blocking the tank port while being shifted to one position and for opening the main valve port to the tank port and blocking the pump port while being shifted to another position, means connecting the main valve to the pilot valve housing for simultaneous shifting thereof, and means for shifting the pilot valve, whereby, upon initial shifting of the main valve in either direction thereof, the pilot valve housing is shifted oppositely to the pilot valve to conjointly control the pilot valve housing ports.

18. In a hydraulic transmission, a shiftable, pressure-operated main valve, a pilot valve for controlling the operation of the main valve comprised of two movable elements mounted to shift in opposite directions, one of which is connected to the main valve to shift therewith, and means for shifting the other element of the pilot valve to initiate operation of the main valve, whereby the pilot valve element connected to the main valve shifts in opposition to the other element thereof to cause full and complete operation of the main valve.

EDWARD J. VANDER VELDE.

REFERENCES CITED

The following references are of record in the file of this patent:

UNITED STATES PATENTS

| Number | Name | Date |
| --- | --- | --- |
| 235,748 | Crisp | Dec. 21, 1880 |
| 726,841 | Ball | May 5, 1903 |
| 939,792 | Blumel | Nov. 9, 1909 |
| 976,917 | Richards | Nov. 29, 1910 |
| 1,357,837 | Bouvier | Nov. 2, 1920 |
| 2,219,488 | Parker | Oct. 29, 1940 |
| 2,264,375 | Hill | Dec. 2, 1941 |
| 2,265,817 | Rockwell | Dec. 9, 1941 |
| 2,312,877 | Campbell | Mar. 2, 1943 |
| 2,316,445 | Marshall | Apr. 13, 1943 |
| 2,362,713 | Mott | Nov. 14, 1944 |